Sept. 3, 1963

A. WALLACE 3,102,953

ELECTROMAGNETIC WAVE GYROSCOPES OR ANGULAR
VELOCITY MEASURING SYSTEMS

Filed July 9, 1958

2 Sheets-Sheet 1

INVENTOR.
AARON WALLACE

BY

*Moses, Nolte + Nolte*

Sept. 3, 1963 A. WALLACE 3,102,953
ELECTROMAGNETIC WAVE GYROSCOPES OR ANGULAR
VELOCITY MEASURING SYSTEMS
Filed July 9, 1958 2 Sheets-Sheet 2

INVENTOR.
AARON WALLACE
BY
Moses, Nolte + Nolte

United States Patent Office 3,102,953
Patented Sept. 3, 1963

3,102,953
ELECTROMAGNETIC WAVE GYROSCOPES OR ANGULAR VELOCITY MEASURING SYSTEMS
Aaron Wallace, New York, N.Y., assignor to Maxson Electronics Corporation, a corporation of New York
Filed July 9, 1958, Ser. No. 746,626
9 Claims. (Cl. 250—51.5)

The present invention relates to electromagnetic wave apparatus for measuring the angular velocity with respect to inertial space and particularly to improvements for increasing the sensitivity and accuracy of such apparatus.

The apparatus according to the invention has application as a rate gyroscope and a gyroscope test turntable, as well as applications to tachometers for generator speed control, inertial navigation and non-magnetic compasses.

The present invention utilizes the principles of the rotational interferometer, which is an apparatus adapted to divide a beam of light into two portions which travel round a given optical path or paths in opposite directions and then are caused to reunite so that an interference pattern is formed. If the entire apparatus is rotated at an angular velocity $\Omega$ in the direction in which one of the light beams travels, the interference fringes are found to be displaced from the position which they occupy when the apparatus is at rest, and the amount of displacement is proportional to the angular velocity.

An object of the present invention is to increase the sensitivity of apparatus of the type referred to above to such an extent that the apparatus can be used as a gyroscope having a sensitivity comparable to or exceeding that of the best rate gyroscopes now known.

The state of development of precision electro-mechanical rate gyroscopes is now in an asymptotic phase in which further improvements in sensitivity and accuracy and low drift rate are accomplished only by extraordinary precision in mechanical and electrical construction.

Accordingly it is another object of the present invention to provide a novel gyroscope in which accuracy and drift rates can be obtained which are difficult to obtain or beyond the capabilities of electro-mechanical gyroscopes.

A more general object of the invention is to provide accurate and sensitive angular velocity measuring apparatus of the type referred to above.

Figure 1:
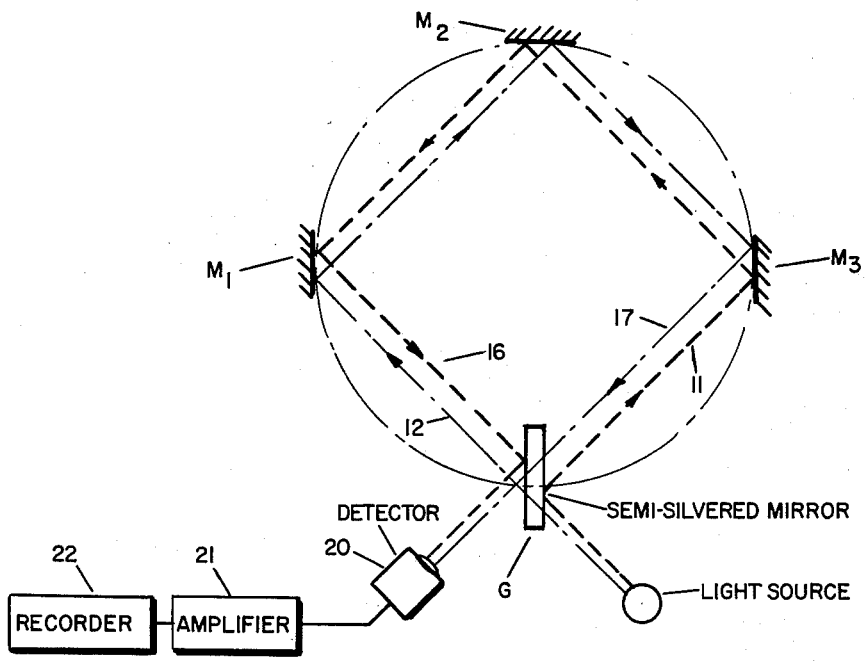
Figure 2:
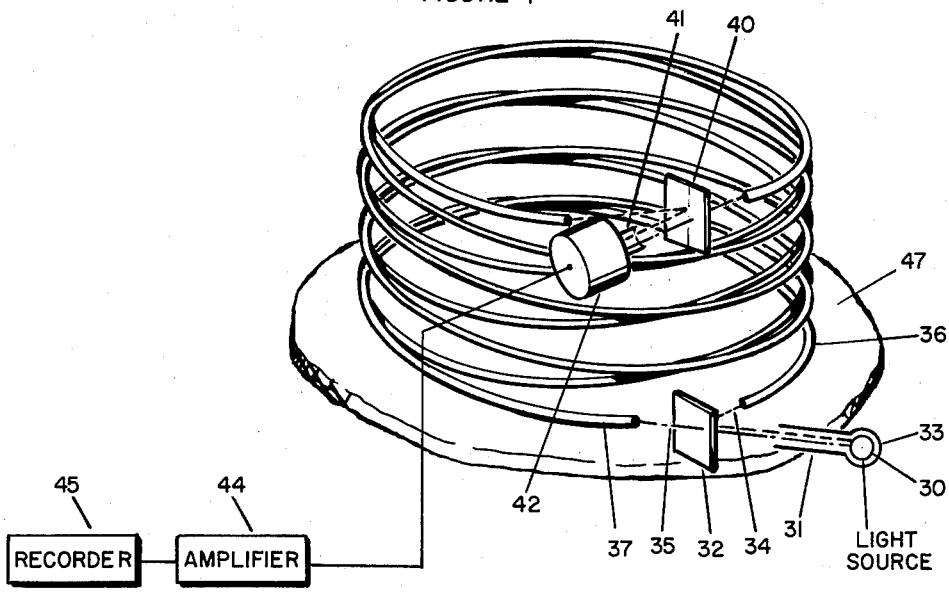
Figure 3:
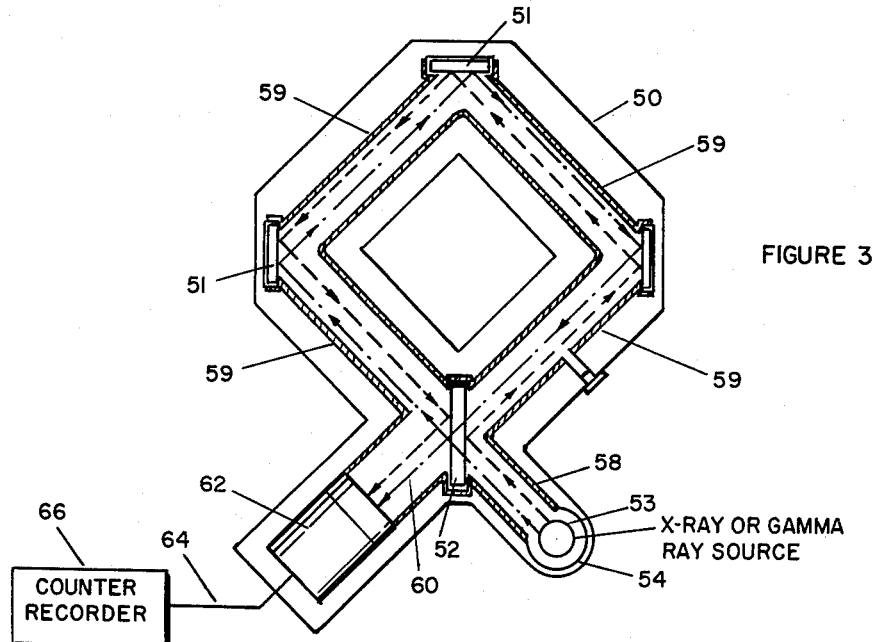
Figure 4:
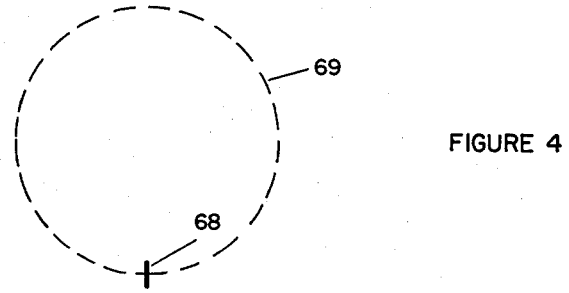
Figure 5:
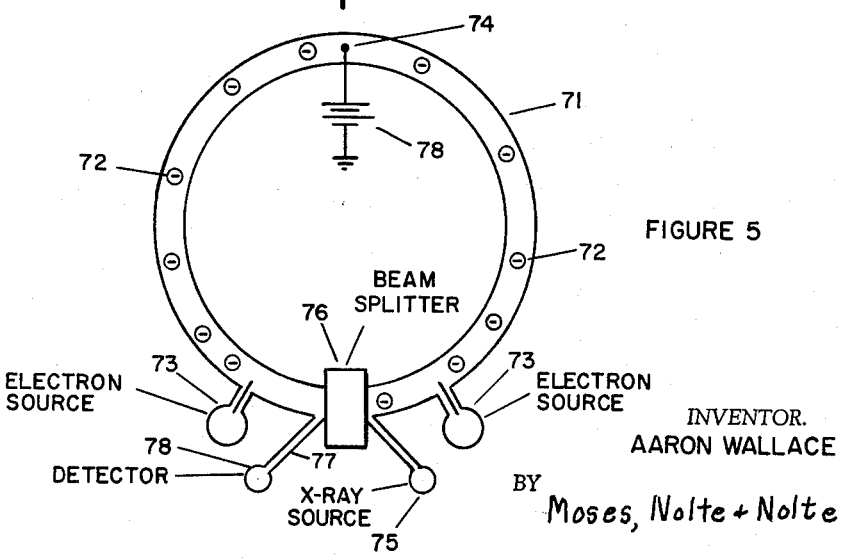

Other objects and advantages of the invention will become apparent and the invention itself will be fully understood from the following description and the drawings in which:

FIG. 1 is a diagram of a rotational interferometer;
FIG. 2 is a modification according to my invention of the apparatus shown in FIG. 1;
FIG. 3 is a diagram of still another embodiment of the invention using gamma rays;
FIG. 4 is a detailed diagrammatic view showing a modification of FIG. 3; and
FIG. 5 is a diagram of another embodiment of my invention.

The present invention will be described with particular reference to an electromagnetic wave inertial rate gyroscope. The principles of the inventon may be explained with reference to FIG. 1 which illustrates a rotational interferometer. Visible light from a source S is directed toward a semi-silvered mirror G. At the mirror G the light beam 10 divides into two light beams 11 and 12. The light source S, the mirror G and all other apparatus are fixed on a base. The light beams 11 and 12 traverse a quadrilateral formed by mirrors $M_1$, $M_2$ and $M_3$. The entire base and the apparatus thereon rotate at an angular velocity $\omega$, and one of the light beams traverses the quadrilateral in the direction of the angular velocity and the other light beam travels in the direction opposite to the angular velocity. The two light beams return to the semi-silvered mirror G along the paths indicated by 16 and 17 so that the two beams are caused to reunite into a beam 18 and produce an interference pattern. The interference fringes are found to be displaced from their rest positions when the apparatus is rotated, and the amount of displacement is proportional to the angular velocity. The light beam 18 is received by any suitable light detector 20 such as a photographic plate, a photo-multiplier tube or other known detecting device. The detector may be sensitive either to a displacement of the fringes or a decrease in intensity. An amplifier 21 and a recorder 22 may be connected to the output of light detector 20.

The mathematical relation between the displacement of the fringes and the angular velocity is given by $$\Delta Z = \frac{4\Omega S}{C\lambda} \tag{1}$$

where $\Delta Z$ is the relative displacement of the fringes,
$\Omega$ is the angular velocity of rotation,
$S$ is the area of the surface enclosed by the light path,
$C$ is the velocity of electromagnetic propagation,
$\lambda$ is the wavelength of the light.

Equation 1 shows that increasing the area decreases the smallest value of angular velocity $\Omega$ that can be detected, i.e., the sensitivity $$\frac{d\Omega}{d(\Delta Z)} = \frac{C\lambda}{4SN_t} \tag{2}$$

increases. A means of increasing the area by increasing the number of turns $N_t$ of the apparatus is shown in FIG. 2.

In FIG. 2 the source 30 of electromagnetic waves may be a source of infra-red light, visible light, or ultra-violet light. The light from source 30 passes through a collimating tube 31 to a semi-silvered beam splitting mirror 32. The collimating tube 31 may be a portion of a light shield 33 surrounding the source. The mirror 32 splits the light from source 30 into two beams 34 and 35 which pass respectively through Lucite tubes or rods 36 and 37. Lucite tubes 36 and 37 may be helices of substantially the same length having a plurality of turns of the same diameter and arranged to conduct the light in clockwise and counterclockwise directions, respectively. As an example, it will be assumed that each helix has ten turns. The ends of the two Lucite helices 36 and 37 terminate at another semi-silvered mirror 40 so that a portion of the light in each helix is directed by the semi-silvered mirror 40 through the collimating tube 41 to a suitable photo detector 42. The output of the photo detector, which may be a phototube or photomultiplier tube, is fed to an amplifier 44 which may include a power supply, and the amplified output is supplied to a suitable recorder 45. The entire apparatus is preferably mounted on the base 47 which may be subjected to an angular rotation. When the base 47 is stationary the two beams may be adjusted to show a given fringe pattern and their intensity is then a maximum. If the base 47 is rotated the fringes will show a displacement and the intensity will decrease. The detector and recorder sense and measure the changes due to the angular rotation.

The sensitivity of the apparatus shown in FIG. 2 may be increased by providing the light source 30 with a mechanically driven shutter or by modulating the light from the source by passing the light through a Kerr cell having a modulation voltage impressed thereacross.

These as well as other techniques for providing a modulated light source will be apparent to those skilled in the art.

The sensitivity of the apparatus shown in FIG. 2 is increased proportionally to the number of turns. The sensitivity may be further increased by spiraling the Lucite tubing within each turn, that is, by forming the Lucite tubing in a flat spiral corresponding to each turn so that each light path would consist of a layer or a number of layers of spirals.

FIG. 3 shows an arrangement for a gyroscope or like device having a greatly increased sensitivity. The sensitivity increase is obtained by using electromagnetic waves in the X-ray or gamma ray region of the spectrum. Substantially the entire apparatus is preferably enclosed in an evacuated metallic shield 50. A source of radiation 53 is provided which may be an X-ray tube with its associated power supply or a gamma ray source in a suitable holder 54, which may be a lead casing. Many gamma ray sources are known, such as cobalt-60, cesium-137, cadmium-109, barium-133 and sodium-22. Radiation from source 53 passes through a suitable collimating tube 58 to a beam splitting crystal plate 52. Plate 52 splits the incident radiation into two beams which travel through collimating tubes 59 in opposite directions round the quadrilateral defined by tubes 59 and crystals 51. Reflecting crystals 51 and crystal 52 may be quartz, rock salt, calcite or other crystals, or a palladium or lead mirror or a ruled grating. The reflecting elements 51 are preferably mounted in suitable holders which can be adjusted or rotated to produce the best reflection characteristics. The beam splitting element 52 is also preferably angularly adjustable. The casing 50 is provided with a suitable vacuum exhaust seal 57. Evacuating means (not shown) for the casing may be provided. The two radiation beams after traversing their respective paths in opposite directions are reunited by the element 52 into beam 60. As already described in reference to previous embodiments of the apparatus the entire apparatus may be given an angular rotation. The beam 60 will show an interference fringe pattern which will vary with the angular rotation. The radiation beam 60 may be received by a detector 62, such as a photographic plate or a scintillation detector or proportional ionization chamber, a Geiger counter, or other suitable device. The output of the detector may be fed over the cable 64 to a counter 66 which may include a recorder.

The apparatus of FIG. 3 has a greatly increased sensitivity, the increase being of the order of $10^4$ power. The sensitivity may be still further increased by using a multiple turn apparatus analogous to that shown in FIG. 2 so that the beams will travel, say ten turns in each direction instead of round a single turn. Still further, as explained in connection with FIG. 2 a spiral may be used in place of each turn to further increase the sensitivity of the apparatus.

It is, of course, not necessary that the path of the beams be quadrilateral. If, as shown in FIG. 4, a large number of reflecting elements 69 are used the radiation beams will follow a nearly circular path. The beam splitting element is indicated at 68.

In FIG. 5 there is shown an arrangement which dispenses with the discrete reflectors used in FIGS. 3 and 4. An evacuated envelope 71, which may be glass, is filled with an electron space charge or electron gas 72 supplied by electron sources such as heated cathodes 73. A small positive potential is applied to a metallic anode 74 from a source 78. Electromagnetic waves are supplied from a suitable source such as an X-ray tube 75 to a beam splitting element, such as a ruled grating 76, which splits the radiation into two oppositely directed beams. The electron space charge 72 is maintained in the tube with the aid of the anode 74 at a sufficient electron density to cause the X-ray beams to be continuously refracted, analogously to radio waves in the ionosphere, around the glass envelope. The two oppositely directed X-ray beams are caused to recombine by the beam splitting elements 76. The recombined beams then pass through a collimating tube 77 to a detector 78 which may be of any of the types mentioned in connection with FIG. 3. The detector 78 will then measure any phase difference between the two beams due to the rotation of the apparatus.

It will be understood that the configuration shown in FIG. 5 multiple turns and spiraling within the turns may be used to increase the sensitivity as already explained in connection with FIG. 2.

It will be apparent to those skilled in the art that many variations, modifications and applications of the invention in addition to those specifically mentioned herein can be made without departing from the principles of the invention. The invention therefore is not to be construed as limited except as defined in the following claims.

I claim:

1. Apparatus for measuring angular velocity comprising means for generating a beam of electromagnetic waves, means for splitting said beam into two beams, means for directing one of said two beams for travel in a clockwise direction around a circular path having a plurality of turns, said path comprising transparent tubing wound in the form of a cylindrical helix, and directing the other of said beams for travel in a counterclockwise direction round a like path having the same plurality of like turns, means at the ends of said paths for recombining said two beams to produce an electromagnetic wave interference pattern, and measuring means responsive to the interference pattern of the recombined beams.

2. Apparatus according to claim 1 wherein said light source includes means for modulating the light.

3. Apparatus for measuring angular velocity comprising means for generating a beam of electromagnetic waves lying in the X-ray to gamma ray region, means for splitting said beam into two beams, means for directing one of said two beams for travel in a clockwise direction round a given path and for directing the other of said two beams for travel in a counterclockwise direction round said path, said paths terminating at said beam splitting means, said beam splitting means being arranged to recombine said two beams to produce an optical interference pattern, and measuring means responsive to the interference pattern of the recombined beams for determining the angular velocity of the apparatus.

4. Apparatus according to claim 3 wherein said means for directing the two beams round said path includes a plurality of crystals located at the corners of a polygon and oriented so as to reflect the waves round said one path from one crystal to the next.

5. Apparatus according to claim 4 including collimating tubes for conducting said waves from the beam splitting means to the adjoining crystals and from one crystal to the next.

6. Apparatus for measuring angular velocity comprising means for generating a beam of X-rays, means for splitting said beam into two beams, means extending from one side of said beam splitting means to the other side thereof and defining a continuous path for said X-rays, said last-mentioned means including a nonconductive evacuated envelope and means in said envelope for producing an electron space charge therein, said beam splitting means being arranged to direct one of said two beams in a clockwise direction round said path and to direct the other of said two beams in a counterclockwise direction round said path, means for recombining said two beams into a single beam to produce an interference pattern therebetween, a unitary mounting means for all the above-mentioned means and measuring means responsive to the interference pattern of the recombined beams.

7. Apparatus according to claim 1 including a unitary rotatable mounting means therefor.

8. A rotational interferometer comprising means for generating a beam of X-rays, means for splitting said beam into two beams, means for directing and continuously refracting one of said two beams for travel in a clockwise direction round a curved path and directing and continuously refracting the other of said beams for travel in a counterclockwise direction round said path, means at the ends of said paths for recombining said two beams to produce an interference pattern, and means for detecting the interference pattern of the recombined beams.

9. Apparatus according to claim 8, wherein said means for refracting the beams includes an envelope enclosing said path and means for generating an electron discharge in said envelope.

References Cited in the file of this patent

UNITED STATES PATENTS

| 2,655,074 | Eckert et al. | Oct. 13, 1953 |
| 2,841,049 | Scott | July 1, 1958 |

OTHER REFERENCES

"Theoretical Physics," by G. Joos, 1st ed., 1932, Hafner, New York, pages 450–451.

Modern Physics by G. E. M. Jauncey; 3rd ed., 3rd printing, pages 263 to 270. Published by D. Van Nostrand Co., Inc., New York, December 1950.

Fundamentals of Optics by F. A. Jenkins and H. E. White, 2nd ed., 2nd Impression, pages 395 to 401. Published by McGraw-Hill Book Co., Inc., New York, 1950.